(No Model.)

K. A. SMITH & J. E. WOODARD.

PUMP VENT.

No. 320,010. Patented June 16, 1885.

Witnesses.
John C. Perkins
J. S. Duer

Inventor.
Kirk A. Smith
John E. Woodard

UNITED STATES PATENT OFFICE.

KIRK A. SMITH AND JOHN E. WOODARD, OF KALAMAZOO, MICHIGAN.

PUMP-VENT.

SPECIFICATION forming part of Letters Patent No. 320,010, dated June 16, 1885.

Application filed October 9, 1884. (No model.)

*To all whom it may concern:*

Be it known that we, KIRK A. SMITH and JOHN E. WOODARD, citizens of the United States, residing at Kalamazoo, county of Kalamazoo, State of Michigan, have invented new and useful Improvements in Pump-Vents, of which the following is a specification.

This invention has for its object to provide a pump-vent which is detachably held against the well-pipe, with a packing between said vent and pipe, whereby the vents may be thus used in a practicable manner.

Figure 1:
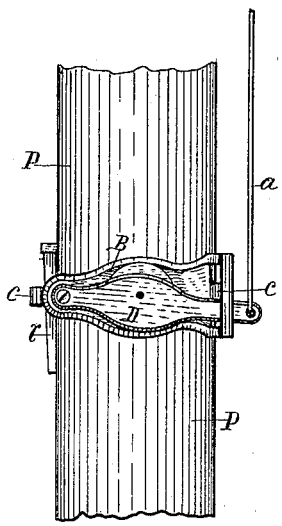
Figure 2:
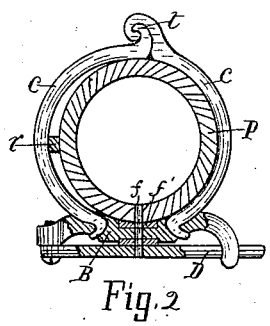
Figure 3:
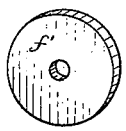

In the drawings, forming a part of this specification, Figure 1 shows a well-pipe with a vent attached. Fig. 2 is a cross-section of Fig. 1, intercepting the vent-hole, parts being left full; and Fig. 3 is a perspective view of the packing.

It is well understood by those skilled in well-and-pump business what use the vent is put to, and as the particular construction of the vent does not pertain to this invention, we will but briefly state that the vent B, with its shut-off D, is located beneath the platform of the well-top for the purpose of drawing off the water from the well-pipe to prevent freezing. The shut-off is operated by a rod which extends above the platform, by which means the hole leading through the pipe P and vent $f$, Fig. 2, is either closed or opened.

The vent B is provided with confining-arms $c\ c$, which detachably hook together around the well-pipe P, thus detachably holding the vent against the well-pipe, in lieu of the former plan of rigidly securing the same to the pipe by either screwing a projection of the vent into the pipe, or fastening the vent to the pipe by screws, which latter manner necessitates time and skilled labor. By simply holding the vent against the pipe detachably, threaded screw-holes are not necessary to be made in the pipe, and the vent may be quickly adjusted by the consumer. The vent in this case constitutes the seat for the shut-off D or pivoted valve. This shut-off has the common packing between it and the vent B, found in other devices, in some of which said packing is secured to the back side of the shut-off and engages the pipe P direct; but in either case said packing moves with the valve, and in no manner is a packing to the vent B or valve-seat, enabling said seat to be held stationary and detachably against the pipe P, (without leaking down between it and the pipe,) as is the case with the packing $f'$, (shown between the valve-seat or vent B and the pipe P,) which thus forms a close engagement of the valve-seat and pipe. By this means the vent may be adjusted from one position to another and changed from one pipe to another without making holes in the well-pipe to secure the vent thereto.

A circular recess may be formed in the vent to receive the detachable packing $f'$, the packing being made thicker than the depth of the recess, as in the manner of fixing the packing in the valve or shut-off D.

Having thus described our invention, what we claim as new, and desire to secure by Letters Patent, is—

In a pump-vent, a valve-seat detachably held against the well-pipe, and a connecting shut-off valve provided with packing interposed between the valve-seat and well-pipe, and the valve-seat and valve, substantially as set forth.

In testimony of the foregoing we have hereunto subscribed our names in presence of two witnesses.

KIRK A. SMITH.
JOHN E. WOODARD.

Witnesses:
D. E. REEME,
W. H. BLENNERHASSETT.